(12) United States Patent
Seo et al.

(10) Patent No.: US 12,298,544 B2
(45) Date of Patent: May 13, 2025

(54) ELECTRONIC APPARATUS HAVING INK LAYER PRINTED FOR FORMING OPENING ON GLASS SUBSTRATE COVERING DISPLAY PANEL

(71) Applicant: SAMSUNG ELECTRONICS CO., LTD., Suwon-si (KR)

(72) Inventors: Youngdeuk Seo, Suwon-si (KR); Il Kim, Suwon-si (KR); Hyeoncheol Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 557 days.

(21) Appl. No.: 17/655,069

(22) Filed: Mar. 16, 2022

(65) Prior Publication Data

US 2022/0221638 A1    Jul. 14, 2022

Related U.S. Application Data

(63) Continuation of application No. PCT/KR2021/020238, filed on Dec. 30, 2021.

(30) Foreign Application Priority Data

Jan. 8, 2021  (KR) .................. 10-2021-0002331

(51) Int. Cl.
 *G02B 5/22*  (2006.01)
 *G06F 1/16*  (2006.01)

(52) U.S. Cl.
 CPC ........... *G02B 5/223* (2013.01); *G06F 1/1686* (2013.01)

(58) Field of Classification Search
 CPC ............................. G02B 5/223; G06F 1/1686
 (Continued)

(56) References Cited

U.S. PATENT DOCUMENTS

2011/0255000 A1    10/2011   Weber et al.
2013/0048837 A1    2/2013    Pope et al.
(Continued)

FOREIGN PATENT DOCUMENTS

CN    110191216          8/2019
CN    110191216  A  *   8/2019    ....... G02F 1/133331
(Continued)

OTHER PUBLICATIONS

Search Report and Written Opinion issued Apr. 21, 2022 in counterpart International Patent Application No. PCT/KR2021/020238.

*Primary Examiner* — Brandi N Thomas
*Assistant Examiner* — Boutsikaris Leonidas
(74) *Attorney, Agent, or Firm* — Nixon & Vanderhye P.C.

(57) ABSTRACT

Disclosed is an electronic apparatus including: a housing; a transparent glass substrate covering at least a portion of the housing, and including a first surface facing a first direction and a second surface facing a second direction opposite to the first direction; a display panel accommodated in the housing, covered with the glass substrate, and including at least one opening configured for light transmission in a display area where an image is displayed; and an ink layer having an opaque color, applied to an opaque area surrounding an edge of the opening to form a light-transmission area corresponding to the opening on the second surface, the ink layer including an inclined area where the ink layer becomes narrower in the second direction from the second surface.

13 Claims, 10 Drawing Sheets

(58) Field of Classification Search
USPC .......................................................... 359/394
See application file for complete search history.

(56) References Cited

U.S. PATENT DOCUMENTS

| | | | |
|---|---|---|---|
| 2013/0242479 A1 | 9/2013 | Yoo et al. | |
| 2018/0196559 A1* | 7/2018 | Lin | G06F 1/1626 |
| 2019/0335027 A1* | 10/2019 | Cheng | G03B 11/045 |
| 2021/0096278 A1* | 4/2021 | Lee | G06F 1/1626 |
| 2022/0061158 A1* | 2/2022 | Jung | H05K 1/186 |
| 2022/0094827 A1* | 3/2022 | Wei | H04N 23/55 |
| 2024/0017537 A1* | 1/2024 | Teraoka | B32B 27/08 |

FOREIGN PATENT DOCUMENTS

| | | |
|---|---|---|
| KR | 10-2013-0024814 | 3/2013 |
| KR | 10-2013-0105125 | 9/2013 |
| KR | 10-2019-0078651 | 7/2019 |

* cited by examiner

ELECTRONIC APPARATUS HAVING INK LAYER PRINTED FOR FORMING OPENING ON GLASS SUBSTRATE COVERING DISPLAY PANEL

CROSS-REFERENCE TO RELATED APPLICATIONS

This application is a continuation of International Application No. PCT/KR2021/020238 designating the United States, filed on Dec. 30, 2021, in the Korean Intellectual Property Receiving Office and claiming priority to Korean Patent Application No. 10-2021-0002331, filed on Jan. 8, 2021, in the Korean Intellectual Property Office, the disclosures of which are incorporated by reference herein in their entireties.

BACKGROUND

Field

The disclosure relates to an electronic apparatus having a display panel and a camera, and for example to an electronic apparatus having a structure with a hole for a camera on a glass substrate covering a display panel and a camera.

Description of Related Art

To compute and process information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be embodied as a display apparatus that displays an image based on processed image data on its own display panel. In particular, there is a mobile device miniaturized to be portable among the display apparatuses, and the mobile device may for example include a smartphone a tablet computer, etc.

In the electronic apparatus having the display panel, a bezel is provided surrounding the display panel. Typically, such a bezel refers to the frame of the electronic apparatus, which hides wiring lines of an electric circuit in the electronic apparatus and an inactive area around a screen, where an image is not displayed, and functions to protect a glass substrate on the front of the electronic apparatus from shock. Recently, the bezel has been designed to decrease in width to achieve a larger screen without increasing the overall size of the electronic apparatus. Conventionally, the bezel includes a camera hole for a front camera of the electronic apparatus, in which the width of the bezel is designed to be larger than the diameter of the camera hole. As an example of further decreasing the width of the bezel, there is a design method of disposing the camera hole in an active area of the display panel, where an image is displayed. In this case, the camera hole is not disposed in the bezel, and it is therefore possible to further decrease the width of the bezel.

However, it has been required to reduce the size of the camera hole for various reasons such as increasing the size of the screen, satisfying a user's aesthetic sense, etc. For example, the camera hole is formed by printing ink having a predetermined color on the glass substrate in a ring shape. As the diameter and thickness of the ring become smaller, defects are likely to occur in the camera hole due to problems that the ink to be printed is smudged, etc.

Accordingly, there may be required a method of easily forming a small front camera hole without excessive design change and additional equipment, and an electronic apparatus manufactured using the same method.

SUMMARY

According to an example embodiment of the disclosure, there is provided an electronic apparatus including: a housing; a transparent glass substrate covering at least a portion of the housing, and including a first surface facing in a first direction and a second surface facing in a second direction opposite to the first direction; a display panel accommodated in the housing, covered with the glass substrate, and including at least one opening configured for light transmission in a display area where an image is displayed; and an ink layer having an opaque color, applied to an opaque area surrounding an edge of the opening to form a light-transmission area corresponding to the opening on the second surface, the ink layer including an inclined area where the ink layer becomes narrower in the second direction from the second surface.

The electronic may further include a laser dot-pattern area adjacent to the opaque area and formed on the second surface of the glass substrate.

The laser dot-pattern area may be formed by at least one of a carbon dioxide ($CO_2$) laser or a green laser.

The inclined area formed based on the $CO_2$ laser may be different in inclination angle from the inclined area formed based on the green laser.

The electronic may further include an optical sensor, wherein the opening is provided to accommodate at least a portion of the optical sensor.

The electronic may further include an adhesive layer interposed between the glass substrate and the display panel to couple the display panel and the glass substrate.

The adhesive layer may include an optically clear adhesive (OCA).

The inclined area may include a first inclined surface formed at an outer edge of the ink layer and being in contact with the adhesive layer.

The electronic apparatus may further include a first laser dot-pattern area formed along the edge of the first inclined surface, on the second surface of the glass substrate being in contact with the adhesive layer.

The inclined area may include a second inclined surface formed at an inner edge of the ink layer surrounding the light-transmission area.

The electronic apparatus may further include a second laser dot-pattern area formed along the edge of the second inclined surface, on the second surface of the glass substrate.

The ink layer may be formed by a black ink layer printed on the glass substrate.

The inclined area may be formed by machining the black ink layer based on a $CO_2$ laser.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
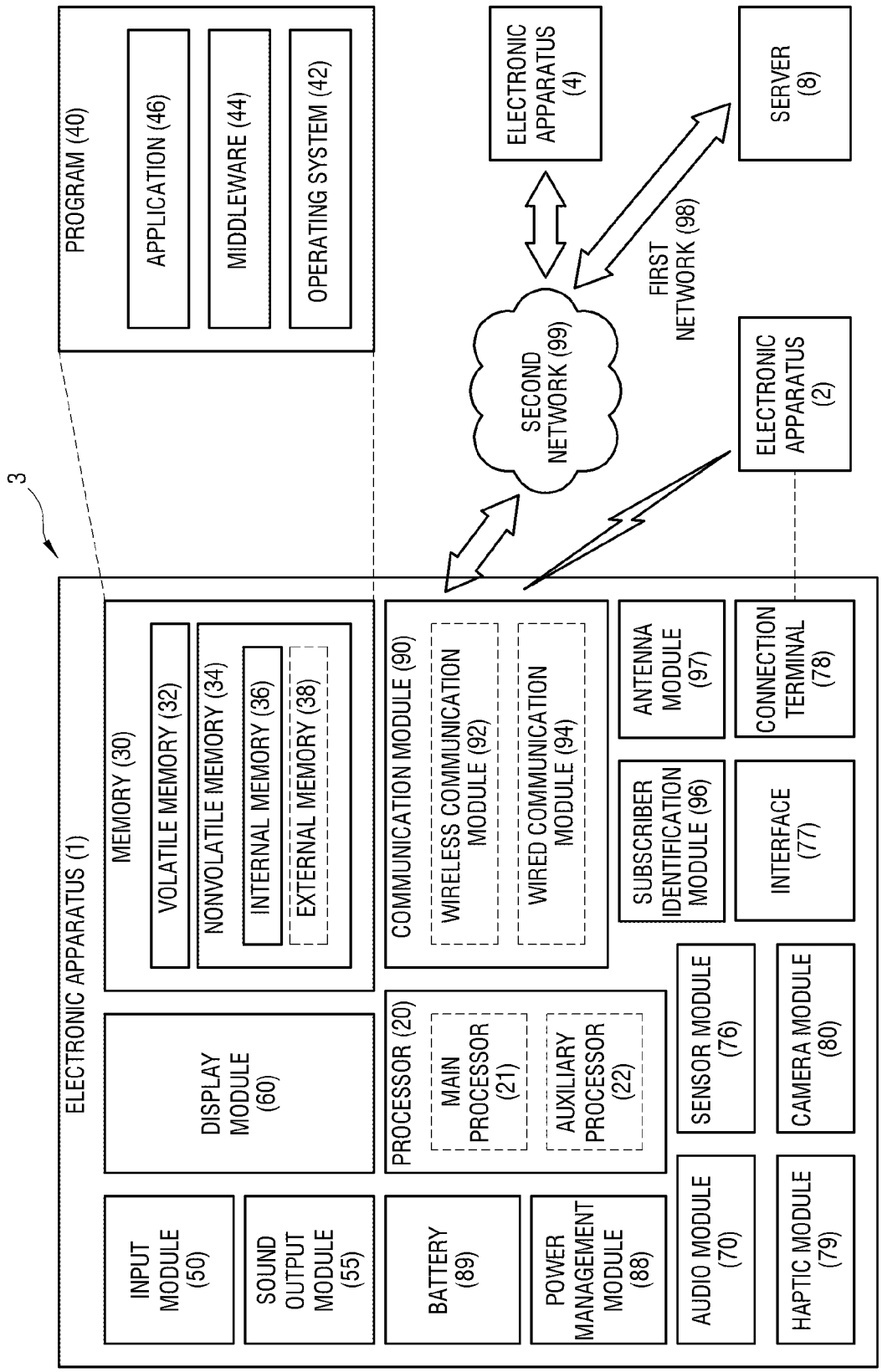
FIG. 1 is a block diagram illustrating an example electronic apparatus in a network environment according to various embodiments.

Below, various example embodiments will be described in greater detail with reference to accompanying drawings. Further, the various example embodiments described with reference to the accompanying drawings are not exclusive to each other unless otherwise mentioned, and a plurality of embodiments may be selectively combined within one apparatus. The combination of these plural embodiments may be discretionally selected and applied to realize the technical concept of the disclosure by a person having an ordinary skill in the art.

Various embodiments of the disclosure and the terms used herein are not intended to limit the technical features described in the disclosure to specific embodiments, and it will be understood that they include various modifications, equivalents, and/or alternatives to the corresponding embodiments. In terms of the drawings, similar reference numerals may be used for similar or related elements. A singular form of a noun corresponding to an item is intended to include one item or a plurality of items unless otherwise mentioned contextually. In the disclosure, the phrases "A or B, A, B" "at least one of A and B", "at least one of A or B", "or C", "at least one of A, B and C", "at least one of A, B or B", or the like may include one, or all possible combinations of elements enumerated together in the corresponding phrase. The terms "first", "second", etc. are used simply to distinguish one element from another, and do not limit the elements in other aspects (for example, importance or order).

FIG. 1 is a block diagram illustrating an example configuration of an electronic apparatus in a network environment according to various embodiments.

As shown in FIG. 1, in a network environment 3, an electronic apparatus 1 may communicate with an electronic apparatus 2 through a first network 98 (e.g., a short-range wireless communication network), or communicate with at least one of an electronic apparatus 4 or a server 8 through a second network 99 (e.g., a long-range wireless communication network). According to an embodiment, the electronic apparatus 1 may communicate with the electronic apparatus 4 with the server 8. According to an embodiment, the electronic apparatus 1 may include a processor 20, a memory 30, an input module 50, a sound output module 55, a display module 60, an audio module 70, a sensor module 76, an interface 77, a connection terminal 78, a haptic module 79, a camera module 80, a power management module 88, a battery 89, a communication module 90, a subscriber identification module 96, or an antenna module 97. In various embodiments, the electronic apparatus 1 may exclude at least one (e.g., the connection terminal 78) of these elements, or may additionally include one or more other elements. In various embodiments, some (e.g., the sensor module 76, the camera module 80, or the antenna module 97) of these elements may be integrated into a single element (e.g., the display module 60).

The processor 20 may for example execute software (e.g., a program 40) to control at least one of other elements (e.g., hardware or software elements) of the electronic apparatus 1 connected to the processor 20, and to perform various data processes or operations. According to an embodiment, as at least a part of the data process or operation, the processor may store an instruction or data received from other elements (e.g., the sensor module 76 or the communication module 90) in a volatile memory 32, process the instruction or data stored in the volatile memory 32, and store data of processing results in a nonvolatile memory 34. According to an embodiment, the processor 20 may include a main processor (e.g., a central processing unit or an application processor), or may include an auxiliary processor 23 (e.g., a graphic processing unit, a neural processing unit (NPU), an image signal processor, a sensor hub processor, or a communication processor) independently or with the main processor 21. For example, when the electronic apparatus 1 includes both the main processor 21 and the auxiliary processor 23, the auxiliary processor 23 may be set to use less power than the main processor 21 or to specialize in a designated function. The auxiliary processor 23 may be embodied separately from or as a part of the main processor 21.

The auxiliary processor 23 may for example control at least a part of functions or states related to at least one element (e.g., the display module 60, the sensor module 76 or the communication module 90) among the elements of the electronic apparatus 1, instead of the main processor 21 while the main processor 21 is inactive (e.g., sleep), or with the main processor 21 while the main processor 21 is active (e.g., to execute an application). According to an embodiment, the auxiliary processor 23 (e.g., the image signal processor or the communication processor) may be embodied as a part of other functionally-related elements (e.g., the camera module or the communication module 90). According to an embodiment, the auxiliary processor 23 (e.g., the NPU) may include a hardware structure that specialize in processing an artificial intelligence (AI) model. The AI model may be created through machine learning. Such learning may for example be performed in the electronic apparatus 1 itself on which the AI model is processed, or may be performed through a separate server (e.g., the server 8). The learning algorithm may for example include but not be limited to supervised learning, unsupervised learning, semi-supervised learning, or reinforcement learning. The AI model may include a plurality of artificial neural network layers. The artificial neural network may include but be not limited to a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or one of two or more combinations thereof. Besides the hardware structure, the AI model may additionally or alternatively include a software structure.

The memory 30 may be configured to store various pieces of data to be used for at least one element (e.g., the processor 20 or the sensor module 76) of the electronic apparatus 1. The data may for example include software (e.g., the program 40), input data or output data with regard to an instruction related to the software. The memory 30 may include the volatile memory 32 or the nonvolatile memory 34.

The program 40 may be stored as software in the memory 30, and may for example include an operating system 42, a middleware 44 or an application 46.

The input module 50 may receive the instruction or data to be used for the element (e.g., the processor 20) of the electronic apparatus 1 from the outside (e.g., a user) of the electronic apparatus 1. The input module 50 may for example include a microphone, a mouse, a keyboard, a key (e.g., a button), or a digital pen (e.g., a stylus pen).

The sound output module 55 may output a sound signal to the outside of the electronic apparatus 1. The sound output module 55 may for example include a loudspeaker or a receiver. The loudspeaker may be used for general purposes such as multimedia reproduction, or recording reproduction. The receiver may be used for receiving an incoming call. According to an embodiment, the receiver may be embodied separately from or as a part of the loudspeaker.

The display module 60 may visually provide information to the outside (e.g., a user) of the electronic apparatus 1. The display module 60 may for example include a display, a hologram device or a projector, and a control circuit for controlling the corresponding device. According to an embodiment, the display module 60 may include a touch sensor set to detect a touch, or a pressure sensor set to measure the strength of force caused by the touch.

The audio module 70 may convert a sound into an electric signal or may reversely convert an electric signal into a sound. According to an embodiment, the audio module 70 may obtain a sound through the input module 50, or output a sound through the sound output module 55, or an external electronic apparatus (e.g., the electronic apparatus 2, the loudspeaker or a headphone) directly or wirelessly connected to the electronic apparatus 1.

The sensor module 76 may detect the operating state of the electronic apparatus 1 (e.g., power or temperature) or the state of an external environment (e.g., a user condition), and generate an electric signal or data value corresponding to the detected state. According to an embodiment, the sensor module 76 may for example include a gesture sensor, a gyro sensor, a barometer, a magnetic sensor, an accelerometer, a grip sensor, a proximity sensor, a color sensor, an infrared (IR) sensor, a biometric sensor, a temperature sensor, a humidity sensor, or an illuminance sensor.

The interface 77 may support one or more designated protocols to be used by the electronic apparatus 1 to be directly or wirelessly connected to the external electronic apparatus (e.g., the electronic apparatus 2). According to an embodiment, the interface 77 may for example include a high-definition multimedia interface (HDMI), a universal serial bus (USB) interface, a secured digital (SD) card interface, or an audio interface.

The connection terminal 78 may include a connector by which the electronic apparatus 1 is physically connectable to the external electronic apparatus (e.g., the electronic apparatus 2). According to an embodiment, the connection terminal 78 may for example include an HDMI connector, a USB connector, an SD card connector, or an audio connector (e.g., a headphone connector).

The haptic module 79 may convert an electric signal into a mechanical stimulus (e.g., vibration or movement) or an electric stimulus to be recognized by a user through tactile or kinesthetic senses. According to an embodiment, the haptic module 79 may for example include a motor, a piezoelectric device, or an electro-stimulator.

The camera module 80 may be configured to take a still image or a moving image. According to an embodiment, the camera module 80 may include one or more lenses, image sensors, image signal processors, or flashes.

The power management module 88 may be configured to manage power supplied to the electronic apparatus 1. According to an embodiment, the power management module 88 may for example be embodied as at least a part of a power management integrated circuit (PMIC).

The battery 89 may supply power to at least one element of the electronic apparatus 1. According to an embodiment, the battery 89 may for example include a non-rechargeable primary cell, a rechargeable secondary cell, or a fuel cell.

The communication module 90 may establish a direct (e.g., wired) communication channel or wireless communication channel between the electronic apparatus 1 and the external electronic apparatus (e.g., the electronic apparatus 2, the electronic apparatus 4, or the server 8), and support communication based on the established communication channel. The communication module 90 may operate independently of the processor 20 (e.g., the application processor), and include one or more communication processors to support the direct (e.g., wired) communication or wireless communication. According to an embodiment, the communication module 90 may include a wireless communication module 92 (e.g., a cellular communication module, a short-range wireless communication module, or a global navigation satellite system (GNSS) communication module) or a wired communication module 94 (e.g., a local area network (LAN) communication module, or a power-line communication module). Among these communication modules, the corresponding communication module may communicate with the external electronic apparatus 4 through the first network 98 (e.g., Bluetooth, Wi-Fi direct or infrared data association (IrDA) or the like short-range communication network) or the second network 99 (e.g., a legacy cellular network, a 5G network, a next-generation communication network, the Internet, a computer network (e.g., LAN or a wide area network (WAN)), or the like long-range communication network). Such various kinds of communication modules may be integrated into one element (e.g., a single chip), or a plurality of element (e.g., a plurality of chips) separated from one another. The wireless communication module 92 may use subscriber information (e.g., international mobile subscriber identity (IMSI)) stored in the subscriber identification module 96 to identify or authenticate the electronic apparatus 1 in the communication network such as the first network 98 or the second network 99.

The wireless communication module 92 may support a 5G network and the next-generation communication technology, for example, new radio (NR) access technology, after the 4G network. The NR access technology may support high-speed transmission of high-capacity data (enhanced mobile broadband (eMBB)), minimization of terminal power and access of multiple terminals (massive machine type communications (mMTC)), or ultra-reliable and low-latency communications (URLLC). The wireless communication module 92 may for example support a high frequency band (e.g., an mmWave band) to achieve a high data-transmission rate. The wireless communication module 92 may support various technologies for securing performance in a high frequency band, for example, beamforming, massive multiple-input and multiple-output (MIMO), full dimensional MIMO (FD-MIMO), an array antenna, analog beam-forming, a large-scale antenna, or the like technologies. The wireless communication module 92 may support various requirements stipulated in the electronic apparatus 1, the external electronic apparatus (e.g., the electronic apparatus 4) or the network system (e.g., the second network 99). According to an embodiment, the wireless communication module 92 may support a peak data rate (e.g., higher than or equal to 20 Gbps) for the eMBB, loss coverage (e.g., lower than or equal to 164 dB) for the mMTC, or U-plane latency (e.g., lower than or equal to 0.5 ms at downlink (DL) and uplink (UL), or lower than or equal to 1 ms at a round trip) for the URLLC.

The antenna module 97 may be configured to transmit or receive a signal or power to the outside (e.g., the external electronic apparatus) or from the outside. According to an embodiment, the antenna module 97 may include an antenna with an emitter provided as a conductor or conductive pattern formed on a substrate (e.g., a printed circuit board (PCB)). According to an embodiment, the antenna module 97 may include a plurality of antennas (e.g., an array antenna). In this case, at least one antenna suitable for communication used in the first network 98, the second network 99 or the like communication network may for example be selected by the communication module 90 among the plurality of antennas. The signal or power may be transmitted or received between the communication module 90 and the external electronic apparatus through at least one antenna selected as above. According to various embodiments, besides the emitter, another element (e.g., a radio frequency integrated circuit (RFIC)) may be additionally formed as a part of the antenna module 97.

According to various embodiments, the antenna module 97 may form an mmWave antenna module. According to an embodiment, the mmWave antenna module may include the RFIC disposed on or adjacent to a PCB, on a first surface (e.g., on a bottom surface) of the PCB and capable of supporting a designated high-frequency band (e.g., the mmWave band), and a plurality of antennas (e.g., the array antenna) disposed on or adjacent to a second surface (e.g., on a top or lateral surface) of the PCB and capable of transmitting or receiving a signal in the designated high-frequency band.

At least some among the elements may be connected to each other through a communication method between peripheral units (e.g., a bus, a general-purpose input and output (GPIO)), a serial peripheral interface (SPI), or a mobile industry processor interface (MIPI)), and exchange a signal (e.g., the instruction or data) with each other.

According to an embodiment, the instruction or data may be transmitted or received between the electronic apparatus 1 and the external electronic apparatus 4 through the server 8 connected to the second network 99. Each external electronic apparatus 2 or 4 may be the same or different type of apparatus as the electronic apparatus 1. According to an embodiment, all or some operations performed in the electronic apparatus 1 may be performed in one or more external electronic apparatuses among the external electronic apparatuses 2, 4 or 8. For example, when the electronic apparatus 1 needs to perform a certain function or service automatically or in response to a request from a user or another apparatus, the electronic apparatus 1 may request one or more external electronic apparatuses to execute at least a part of the function or service instead of or in addition to execution of the function or service in itself. One or more external electronic apparatuses, which have received the request, may execute at least a part of the requested function or service, or an additional function or service related to the request, and transmit a result of the execution to the electronic apparatus 1. The electronic apparatus 1 may provide the result as it is or as it is additionally processed, as at least a part of response to the request. To this end, there may be used computing technologies, for example, cloud computing, distributed computing, mobile edge computing (MEC), or client-server computing. The electronic apparatus 1 may for example employ the distributed computing or the MEC to provide a ultra-low latency service. According to an embodiment, the external electronic apparatus 4 may employ an Internet of things (IoT) device. The server 8 may include an intelligent server based on the machine learning and/or neural network. According to an embodiment, the external electronic apparatus 4 or the server 8 may be included in the second network 99. The electronic apparatus 1 may be applied to an intelligent service (e.g., a smart home, a smart city, a smart car, or health care) based on the 5G communication technology and IoT-related technology.

The electronic apparatus 1 according to various embodiments of the disclosure may include various types of apparatuses. The electronic apparatus 1 may for example include a mobile communication apparatus (e.g., a smartphone), a computer system, a portable multimedia device, a portable medical apparatus, a camera, a wearable device, home appliances, or the like. The electronic apparatus 1 according to the embodiments of the disclosure is not limited to the foregoing apparatuses.

Figure 2:
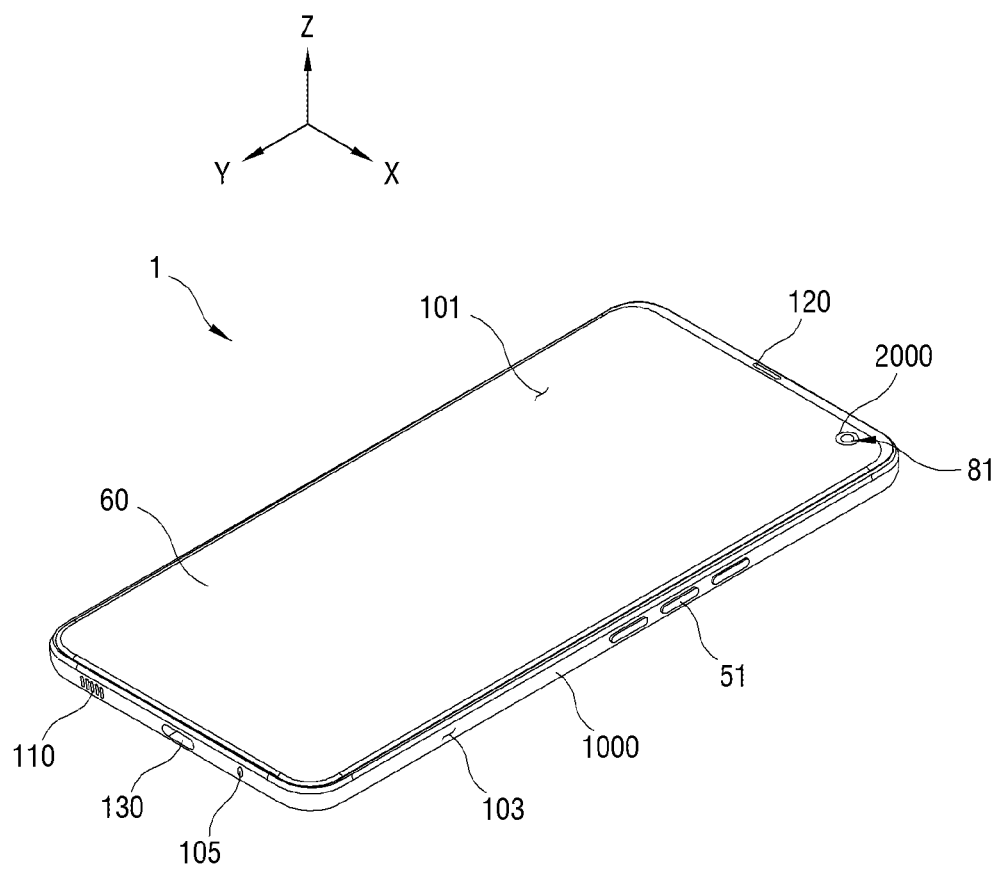
FIG. 2 is a front perspective view of an electronic apparatus according to various embodiments.
Figure 3:
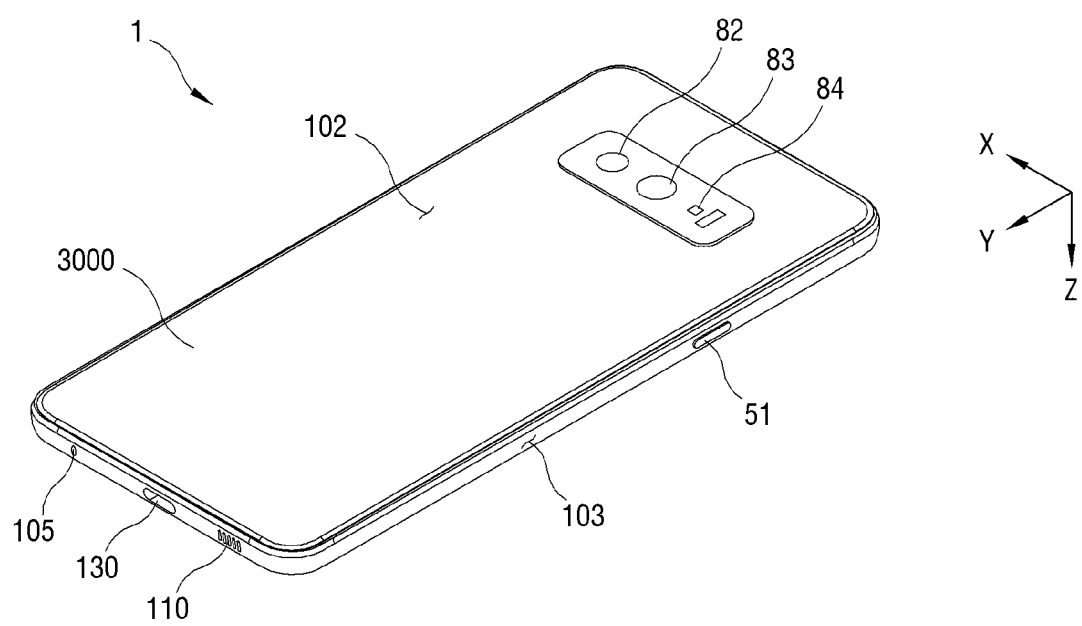
FIG. 3 is a rear perspective view of the electronic apparatus in FIG. 2 according to various embodiments.

FIG. 2 is a front perspective view of an electronic apparatus according to various embodiments, and FIG. 3 is a rear perspective view of the electronic apparatus in FIG. 2 according to various embodiments.

As shown in FIGS. 1, 2 and 3, the electronic apparatus 1 according to various embodiments may include a housing 1000. The housing 1000 forms at least a part of a front surface 101, a back surface 102, and a lateral surface (or a lateral wall, frame, bezel, etc.) 103 surrounding a space between the front surface 101 and the back surface 102 of the electronic apparatus 1.

In the accompanying drawings, X, Y, Z directions are shown. The X direction refers to a widthwise direction of the electronic apparatus 1, the Y direction refers to a lengthwise direction of the electronic apparatus 1, and the Z direction refers to a direction normal to the front surface 101 of the electronic apparatus 1.

According to various embodiments, the electronic apparatus 1 may include a substantially transparent front plate 2000 (e.g., a glass or polymer substrate including various coating layers) forming at least a portion of the front surface 101. In other words, the front plate 2000 corresponding to the front surface of the electronic apparatus 1, on which a screen is formed. The edges of the front plate 2000 may be supported by the housing 1000. The front plate 2000 may be designed to form a curved portion seamlessly extended bending from the front surface 101 toward a back plate 3000 in at least a one-side end portion. The front plate 2000 may include a protective film layer attached to the surface of the front plate 2000 in the Z direction. In a case of the electronic apparatus 1 in which a sensor (e.g., an ultrasonic fingerprint sensor) is mounted onto the display module 60, the protective film layer is provided to protect such a sensor. In this case, the protective film layer may include an opening in an area corresponding to a camera module 81.

According to various embodiments, the electronic apparatus 1 may include the substantially opaque back plate 3000 forming at least a portion of the back surface 102. The back plate 3000 may for example be formed by coated or tinted glass, ceramic, polymer, metal (e.g., aluminum, stainless steel (STS), or magnesium) or combination of at least two of these materials. The back plate 3000 may be designed to form a curved portion seamlessly extended bending from the back surface 102 toward the front plate 2000 in at least a one-side end portion.

According to various embodiments, the housing 1000 may be formed integrally with and including the same material (e.g., aluminum or the like metal) as the front plate 2000 and/or the back plate 3000. For example, the electronic apparatus 1 may have a structure where the front plate 2000 forms the front surface 101, and the housing 1000 supporting the edges of the front plate 2000 forms the back surface 102 and the lateral surface 103 of the housing 1000.

The housing 1000 may include a microphone hole 105, loudspeaker holes 110 and 120, a connector hole 130, etc. However, one or more among the microphone hole 105, the loudspeaker holes 110 and 120, and the connector hole 130 may alternatively be designed to be provided in the front plate 2000 or the back plate 3000. In various embodiments, a microphone for obtaining an external sound may be placed inside the microphone hole 105. In various embodiments, a plurality of microphones may be placed inside the microphone hole 105 to detect the direction of a sound. In various embodiments, the loudspeaker hole 110 and the microphone hole 105 may be provided as a single hole, or a loudspeaker (e.g., a piezo loudspeaker) may be provided without the loudspeaker holes 110 and 120. The loudspeaker holes 110 and 120 may include the external loudspeaker holes. The connector hole 130 may accommodate therein a connector for exchanging power and/or data with the external electronic apparatus, a connector for exchanging an audio signal with the external electronic apparatus, and/or the like connection terminal 78 (see FIG. 1). For example, the connector hole 130 may include a USB connector or an earphone jack.

According to various embodiments, the electronic apparatus 1 may include at least one of the display module 60, the camera modules 80 (refer to FIG. 1), 81, 82, 83, and/or a key input module 51. The electronic apparatus 1 may be designed to exclude at least one (e.g., the key input module 51) from the elements, or additionally include another undescribed element. For example, the electronic apparatus 1 may include a sensor module (not shown). For example, a fingerprint sensor, a proximity sensor, an illuminance sensor or the like sensor may be integrated into the display module 60 or disposed at a position adjacent to the display module 60 within the area provided by the front plate 2000. The electronic apparatus 1 may further include a light emitting device, and the light emitting device may be disposed at a position adjacent to the display module 60 within the area provided by the front plate 2000. The light emitting device may for example provide information about the state of the electronic apparatus 1 in the form of light. The light emitting device may for example provide a light source interacting with the operation of the camera module 81. The light emitting device may for example include at least one among a light emitting diode (LED), an infrared (IR) LED or a xenon lamp.

The display module 60 may for example be covered with the front plate 2000. The edges of the display module 60 may be designed to have substantially the same shape as the adjacent outer edges (e.g., the curved portion) of the front plate 2000. According to an embodiment, to enlarge the area in which the display module 60 is exposed, the outer edges of the display module 60 may have the same shape as the outer edges of the front plate 2000. A recess or opening may be formed in a portion of a screen display area of the display module 60, and other electronic parts, for example, the camera module 81, the proximity sensor (not shown) or the illuminance sensor (not shown) may be included being aligned with the recess or the opening.

The key input module 51 may be disposed on the lateral surface 103 of the housing 1000. The electronic apparatus 1 may be designed to exclude some or all the foregoing key input modules 51, and the excluded key input module 51 may be embodied in different forms such as a soft key, etc. on the display module 60.

The electronic apparatus 1 may include the sensor module (not shown) to generate an electric signal or a data value corresponding to an internal operating state or an external environmental state. The sensor module may for example further include the proximity sensor disposed on the front surface 101 of the housing 1000, the fingerprint sensor integrated into or adjacent to the display module 60, and/or the biometric sensor (e.g., a heat rate monitor (HRM) sensor) disposed on the back surface 102 of the housing 1000. The electronic apparatus 1 may further include at least one of various sensor modules, for example, and without limitation, the gesture sensor, the gyro sensor, the barometer, the magnetic sensor, the accelerometer, the grip sensor, the color sensor, the IR sensor, the biometric sensor, the temperature sensor, the humidity sensor, the illuminance sensor, or the like. The electronic apparatus 1 may be designed to be combined with or adjacent to a touch detection circuit, a pressure sensor for measuring the strength (pressure) of a touch, and/or a digitizer for detecting a stylus pen using a magnetic field.

The camera module 80 (refer to FIG. 1) may include a first camera module (or a front camera module) 81 disposed on the front surface 101 of the electronic apparatus 1, one or more second camera modules (or back camera modules) 82 and 83 disposed on the back surface 102, and/or a flash 84. The camera modules 81, 82 and 83 may include a single lens or a plurality of lenses, an image sensor, and/or an image signal processor. The flash 84 may for example include a light emitting diode or a xenon lamp. Two or more lenses (e.g., an IR camera, a pantoscopic lens, and a telescopic lens) and image sensors may be disposed on one surface of the electronic apparatus 1.

Below, a structure where the front camera module 81 of the electronic apparatus 1 is installed will be described in greater detail.

Figure 4:
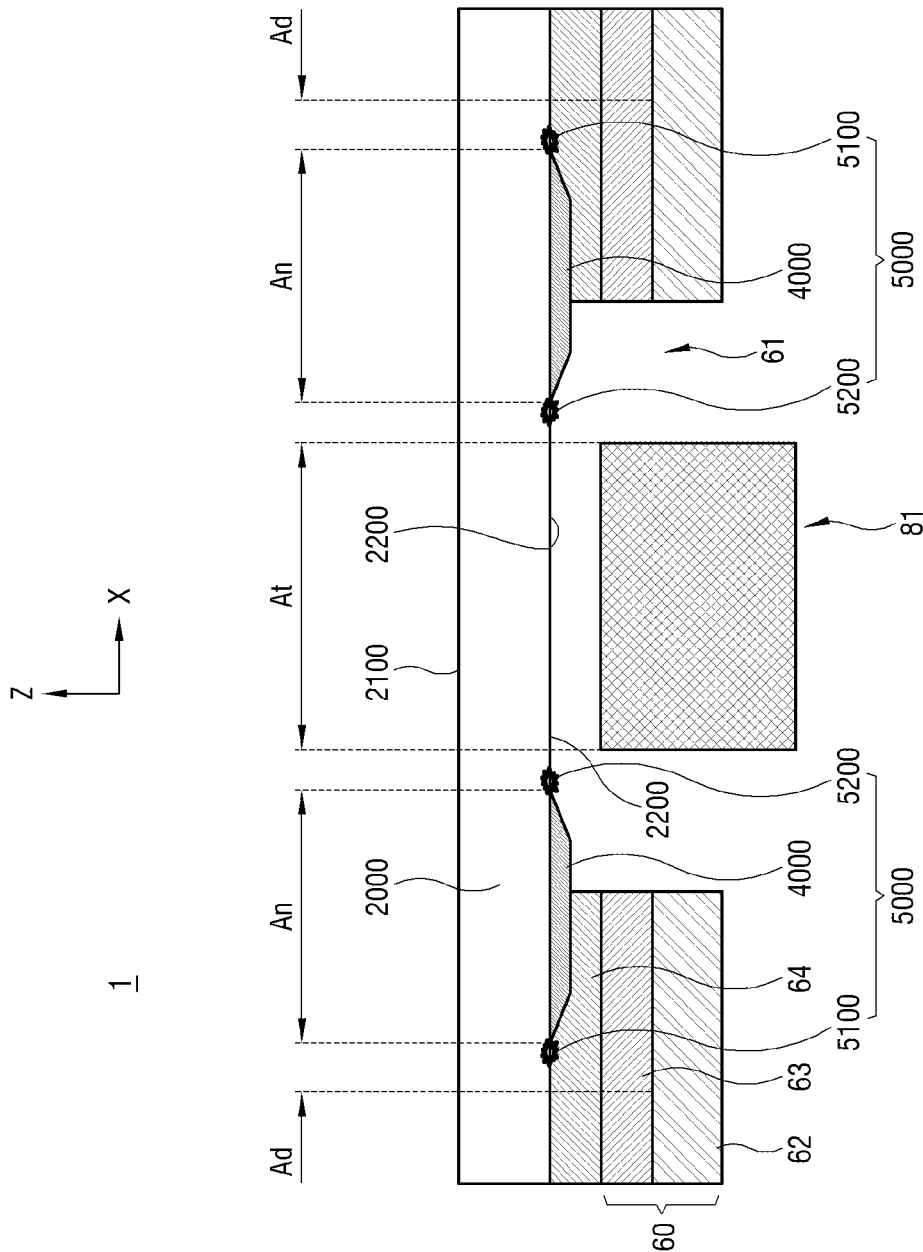
FIG. 4 is a lateral cross-section view illustrating a front camera module of FIG. 2 provided in a front plate according to various embodiments.

FIG. 4 is a lateral cross-section view showing a front camera module of FIG. 2 provided in a front plate according to various embodiments.

As shown in FIG. 4, the front plate 2000 covers the display module 60 and the camera module 81. The front plate 2000 includes a first surface 2100 facing toward the outside of the electronic apparatus 1 and which may be exposed to be touched by a user, and a second surface 2200 disposed opposite to the first surface 2100 and facing toward the inside of the electronic apparatus 1. The second surface 2200 of the front plate 2000 faces toward the display module 60 and the camera module 81.

The display module 60 is formed with a camera accommodating hole 61 penetrating a certain area thereof. The camera module 81 is accommodated in the camera accommodating hole 61. The surface of the display module 60 covered with the front plate 2000 is broadly divided into three areas: a first area may include a display area Ad where an image is displayed by the display module 60; a second area may include a light-transmission area At where light is transmitted for the camera module 81 so that the camera module 81 can take an image (e.g., receive light); and a third area may include an opaque area An provided to surround the light-transmission area At and form a boundary between the display area Ad and the light-transmission area At. A margin may be formed in consideration of tolerance between the light-transmission area At and the opaque area An and between the opaque area An and the display area Ad. The light-transmission area At may be positioned corresponding to the camera accommodating hole 61, and have a smaller diameter than the camera accommodating hole 61. The camera module 81 may be bigger than the light-transmission area At. In this case, only a portion (e.g., a lens area) of the camera module 81 is exposed to the outside through the light-transmission area At.

In an embodiment, the camera accommodating hole 61 accommodates the camera module 81 therein. However, the camera accommodating hole 61 may alternatively be designed to accommodate not the camera module 81 but the optical sensor (e.g., the proximity sensor, the fingerprint sensor, etc.) in the corresponding opening thereof. In this case, a material (e.g., ink or the like) for forming a translucent area may be applied to the area of the second surface 2200 of the front plate 2000 corresponding to the opening.

The display module 60 may include a display panel 62. The display panel 62 forms a screen on which an image is displayed. The display panel 62 may be variously designed, for example, to include a non self-emissive light emitting device such as a liquid crystal display, or a self-emissive light emitting device such as an organic light emitting diode. In this embodiment, the display panel 62 and a polarizing layer 63 (to be described later) are described as individual elements. However, according to points of view, the polarizing layer 63 may be regarded as an element involved in the display panel 62. Further, the display module 60 may include a touch sensor or a digitizer sensor coupled to the display panel 62. The touch sensor or the digitizer sensor is configured to detect a touch input based on a user's finger or the like or a touch input based on the stylus pen. The touch sensor may be provided on the display panel 62 in the Z direction (e.g., in a direction toward the front plate 2000). The digitizer sensor may be provided on the display panel 62 in the −Z direction.

The display module 60 may include the polarizing layer 63. The polarizing layer 63 is provided to perform various functions according to the structures of the display panel 62. When the display panel 62 includes the non self-emissive light emitting device, the polarizing layer 63 functions as a shutter for selectively transmitting light having properties needed for displaying an image. On the other hand, when the display panel 62 includes the self-emissive light emitting device, the polarizing layer 63 functions to enhance visibility by clearly expressing a black screen of the display panel 62 and suppressing reflection of external light from the display panel 62. Alternatively, when the display panel 62 is the self-emissive light emitting device, the display module 60 may be designed to exclude the polarizing layer 63.

The electronic apparatus 1 includes an adhesive layer 64 by which the display module 60 including the display panel 62 adheres to the front plate 2000. The adhesive layer 64 makes the display panel 62 or the polarizing layer 63 adhere to the second surface 2200 of the front plate 2000. Because light is refracted or reflected at a boundary between layers of different materials, the adhesive layer 64 includes an optical material so that difference in characteristics between incident light and exit light can be as small as possible, thereby minimizing or significantly reducing deterioration in the visibility of the display. Further, because the adhesive layer 64 covers one side of the display panel 62, the adhesive layer 64 needs to not only have high transparency but also maintain the high transparency at the time of adhesion not to change over time. For example, the adhesive layer 64 may include an optically clear adhesive (OCA).

According to an embodiment, the electronic apparatus 1 includes an ink layer 4000 having an opaque color and applied to the opaque area An, so that the light-transmission area At can be formed corresponding to the camera accommodating hole 61 on the second surface 2200 of the front plate 2000. The ink layer 4000 may be provided by printing ink having a predetermined (specified) color on the second surface 2200 of the front plate 2000. There are no limits to the opaque color of the ink layer 4000, in which the opaque color may for example include black having high light absorptivity. The ink layer 4000 may, for example, be shaped like a ring to form the opening, e.g., the light-transmission area At through which incident light passes to enter the camera module 81. The ink layer 4000 forms the opaque area An, thereby minimizing or reducing interference between light passing through the light-transmission area At and light based on an image displayed on the display area Ad.

The ink layer 4000 may be provided to have a trapezoidal cross-section turned upside down in FIG. 4. In other words, the ink layer 4000 becomes wider in the Z direction, and becomes narrower in the direction opposite to the Z-direction. The structure of the ink layer 4000 may be formed by laser machining (to be described later).

Further, the electronic apparatus 1 may include laser dot-pattern areas 5000 formed at the inner and outer edges of the opaque area An on the second surface 2200 of the front plate 2000. The laser dot-pattern areas 5000 may be formed as a result of the laser machining (to be described later).

Below, the structure of the ink layer 4000 and the laser dot-pattern area 5000 will be described in greater detail.

Figure 5:
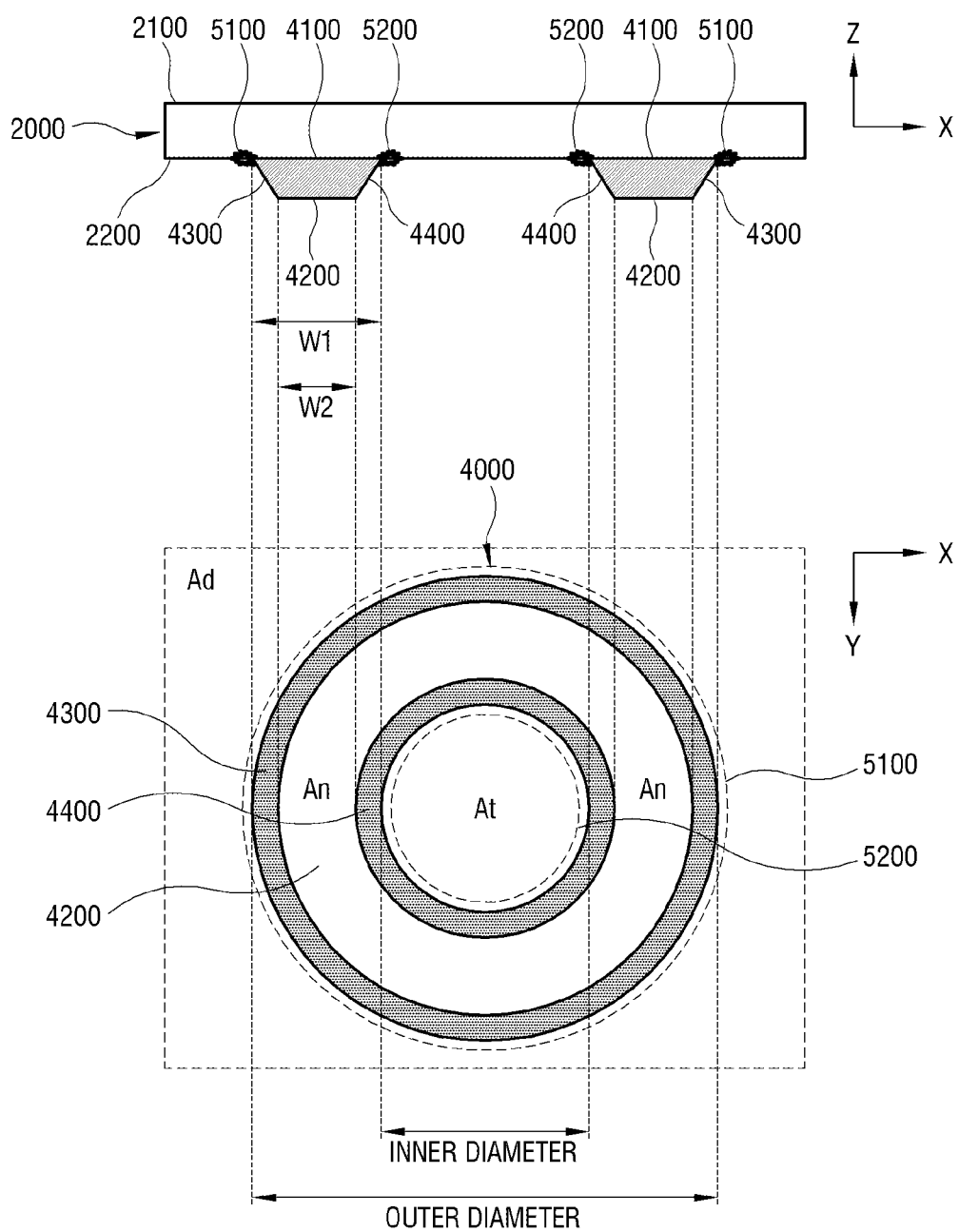
FIG. 5 is a diagram matching a cross-section view and a plan view of an ink layer and a laser dot-pattern area according to various embodiments.

FIG. 5 is a diagram matching between a cross-section view and a plan view of an ink layer and a laser dot-pattern area according to various embodiments.

As shown in FIGS. 4 and 5, the ink layer 4000 is formed on the opaque area An between the display area Ad and the light-transmission area At. There are no limits to the shape of the ink layer 4000 on the plane, but the ink layer 4000 may for example be shaped like a ring in which the light-transmission area At is disposed at the center thereof.

The ink layer 4000 may have a trapezoidal cross-section. In this cross-section, a first layer surface 4100 refers to a surface with which the second surface 2200 of the front plate 2000 is in contact, and a second layer surface 4200 refers to a surface facing toward the display module 60. In an embodiment, a partial area of the outer side of the second layer surface 4200 adheres to the adhesive layer 64. In the foregoing cross-section, a first inclined surface 4300 refers to an outer lateral surface connecting an outer edge of the first layer surface 4100 and an outer edge of the second layer surface 4200, and a second inclined surface 4400 refers to an inner lateral surface connecting an inner edge of the first layer surface 4100 and an inner edge of the second layer surface 4200. The first inclined surface 4300 refers to a surface which adheres to the adhesive layer 64. The second inclined surface 4400 refers to a surface surrounding the light-transmission area At.

The width W1 of the first layer surface 4100 is greater than the width W2 of the second layer surface 4200 (W1>W2). Therefore, the first inclined surface 4300 is not perpendicularly formed between the second surface 2200 of the front plate 2000 and the second layer surface 4200 of the ink layer 4000, but forms an inclined surface. Therefore, when the adhesive layer 64 adheres to the second surface 2200 of the front plate 2000 and the second layer surface 4200 of the ink layer 4000, bubbles are prevented or reduced from being formed in the adhesion area, thereby reducing defects caused by the bubbles. The ink layer 4000 in this embodiment is a single ink layer, but may be designed to have a structure where a plurality of ink layers (e.g., ink layers formed of different kinds of ink) are stacked. Even when the plurality of ink layers are stacked, the first inclined surface 4300 and the second inclined surface 4400 may be formed in the ink layer 4000 by the laser machining. Further, a partial area of the ink layer 4000 is covered with the adhesive layer 64. For example, the adhesive layer 64 is stacked on the entire area of the first inclined surface 4300 and the outer area of the second layer surface 4200 in the ink layer 4000.

The second inclined surface 4400 reduces the total volume of the ink layer 4000 and occupies less space in camera accommodating hole 61, thereby minimizing or reducing interference between light entering or exiting the camera module 81 through the light-transmission area At and the ink layer 4000. Thus, the ink layer 4000 may have both the first inclined surface 4300 and the second inclined surface 4400, or may be designed to have the first inclined surface 4300 without the second inclined surface 4400. When the second inclined surface 4400 is not provided, the ink layer 4000 may have a perpendicular lateral surface connecting the inner edge of the first layer surface 4100 and the inner edge of the second layer surface 4200. The ink layer 4000 may be designed to have the second inclined surface 4400 without the first inclined surface 4300. The second inclined surface 4400 may be formed by a machining method other than a $CO_2$ laser machining (to be described later). Further, according to machining methods of the first inclined surface 4300 and the second inclined surface 4400, a first pattern area 5100 and a second pattern area 5200 may be different in pattern or shape from each other.

The laser dot-pattern area 5000 may include the first pattern area 5100 adjacent to the outer edge of the first layer surface 4100 of the ink layer 4000 or to an edge where the first layer surface 4100 meets the first inclined surface 4300, and formed on the second surface 2200 of the front plate 2000. Further, the laser dot-pattern area 5000 may include the second pattern area 5200 adjacent to the inner edge of the first layer surface 4100 of the ink layer 4000 or to an edge where the first layer surface 4100 meets the second inclined surface 4400, and formed on the second surface 2200 of the front plate 2000. In the plan view of the ink layer 4000, the first pattern area 5100 is shaped like a ring to surround the outer edge of the ink layer 4000, and the second pattern area 5200 is shaped like a ring to surround the inner edge of the ink layer 4000.

With a developing trend toward miniaturization or the like of the electronic apparatus 1, the diameter of the light-transmission area At decreases, and therefore the diameter of the ink layer 4000 also decreases. For example, as both the inner and outer diameters of the ink layer 4000 are decreased, the volume of ink to be printed for forming the ink layer 4000 is also decreased. Therefore, precision is required in a method of machining the layer of the printed ink by forming the first inclined surface 4300 and the second inclined surface 4400 after printing the ink on the second surface 2200 of the front plate 2000. In an embodiment, a laser machining method may be used as such a method, for example, using a carbon dioxide ($CO_2$) laser, which will be described later. The laser dot-pattern area 5000 appears as a result of applying the $CO_2$ laser machining to the first inclined surface 4300 and the second inclined surface 4400.

Below, the machining method based on the $CO_2$ laser will be described.

Figure 6:
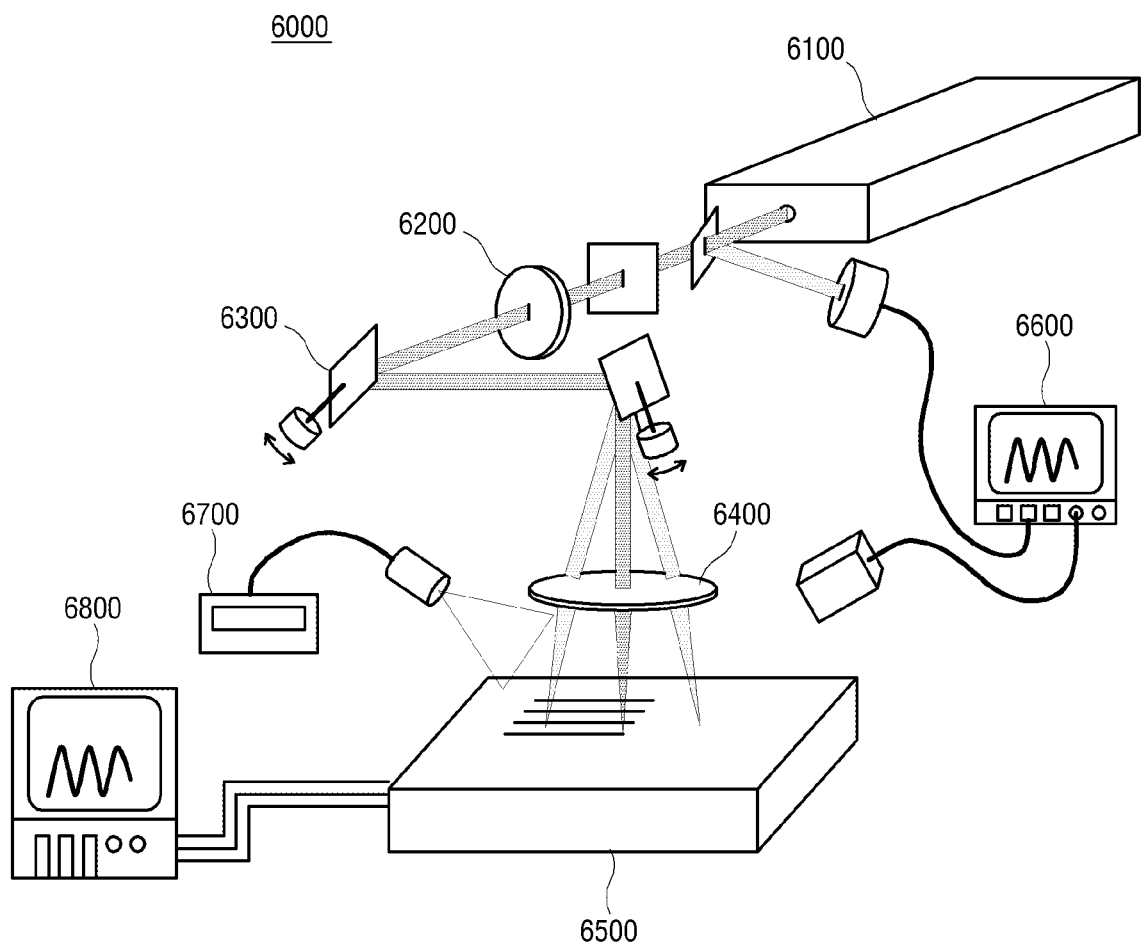
FIG. 6 is a diagram illustrating an example machining method based on a $CO_2$ laser-beam machining apparatus according to various embodiments.

FIG. 6 is a diagram illustrating an example machining method based on a $CO_2$ laser-beam machining apparatus according to various embodiments.

As shown in FIGS. 5 and 6, a $CO_2$ laser-beam machining apparatus (hereinafter, referred to as a processing apparatus) 6000 is provided for machining the first inclined surface 4300 and the second inclined surface 4400 in the ink layer 400 printed on the front plate 2000.

The processing apparatus 6000 includes a laser source 6100 to produce a laser. In an embodiment, the laser source 6100 emits a $CO_2$ laser beam. The $CO_2$ laser refers to a laser produced using carbon dioxide gas as a medium, in which carbon dioxide gas has high energy-concentration on a target and very short pulses because it has a lower degree of reflection and scattering than other media, thereby reducing damage due to the laser in an area around the target.

The processing apparatus 6000 includes a beam characteristic adjuster 6200 to adjust the characteristics of the beam emitted from the laser source 6100. The beam characteristic adjuster 6200 may for example include a beam expander telescope (BET) to expand the thickness of the beam. The beam characteristic adjuster 6200 may adjust various characteristics without being limited to the thickness of the beam.

The processing apparatus 6000 includes a beam transmitter 6300 to transmit the beam, the characteristics of which are adjusted by the beam characteristic adjuster 6200. The beam transmitter 6300 guides the beam to an object-to-be-machined (in an embodiment, the ink layer 4000 printed on the front plate 2000) on a processing frame 6500. The beam transmitter 6300 may for example include a rotatable mirror, thereby adjusting a path of the beam to the positions corresponding to the first inclined surface 4300 or the second inclined surface 4400 on the ink layer 4000.

The processing apparatus 6000 includes a focus lens 6400 to focus the beam upon the object-to-be-machined on the processing frame 6500. The focus lens 6400 makes the expanded beam be focused upon the object-to-be-machined.

The processing apparatus 6000 includes the processing frame 6500 on which an object-to-be-machined is put. On the processing frame 6500, the front plate 2000 to which a black inky layer is applied is put. The processing frame 6500 is provided to be movable.

The processing apparatus 6000 includes a beam characteristic measurer 6600 to measure the characteristics of the beam in real time. The beam characteristic measurer 6600 measures the characteristics of the beam in stages, like the beam emitted from the laser source 6100, the beam focused by the focus lens 6400, etc. The beam characteristic measurer 6600 may include various devices such as a sensor, a camera, etc. for measuring the characteristics of the beam.

The processing apparatus 6000 includes a machined-portion examiner 6700 to examine a machining product of the object which has been subjected to the machining of the beam. The machined-portion examiner 6700 may examine how much the first inclined surface 4300 and the second inclined surface 4400 of the ink layer 4000 are machined (for example, an inclination angle), examine the product of the laser dot-pattern area 5000 formed on the front plate 2000, etc., thereby identifying defects. The machined-portion examiner 6700 may include various devices such as an ultrasound device, a camera, etc.

The processing apparatus 6000 includes a machining controller 6800 to control the position of the processing frame 6500 or the characteristics of the produced beam based on information fed back from the beam characteristic measurer 6600, the machined-portion examiner 6700, etc. The machining controller 6800 may include a computer. For example, the machining controller 6800 may control the position of the processing frame 6500 or the actuation of the beam transmitter 6300 when feedback information that the first inclined surface 4300 or the second inclined surface 4400 is out of position is received from the machined-portion examiner 6700, thereby controlling the first inclined surface 4300 or the second inclined surface 4400 to be in position. The machining controller 6800 may control the position of the focus lens 6400 to make the beam be in focus when feedback information that the beam is out of focus is received from the beam characteristic measurer 6600. The machining controller 6800 may control the laser source 6100 or the beam characteristic adjuster 6200 so that the beam can have suitable characteristics when feedback information that the characteristics of the beam are not suitable is received from the beam characteristic measurer 6600.

Accordingly, the processing apparatus 6000 employs the $CO_2$ laser among various kinds of lasers. In an example embodiment, the reason for using the $CO_2$ laser is as follows.

Figure 7:
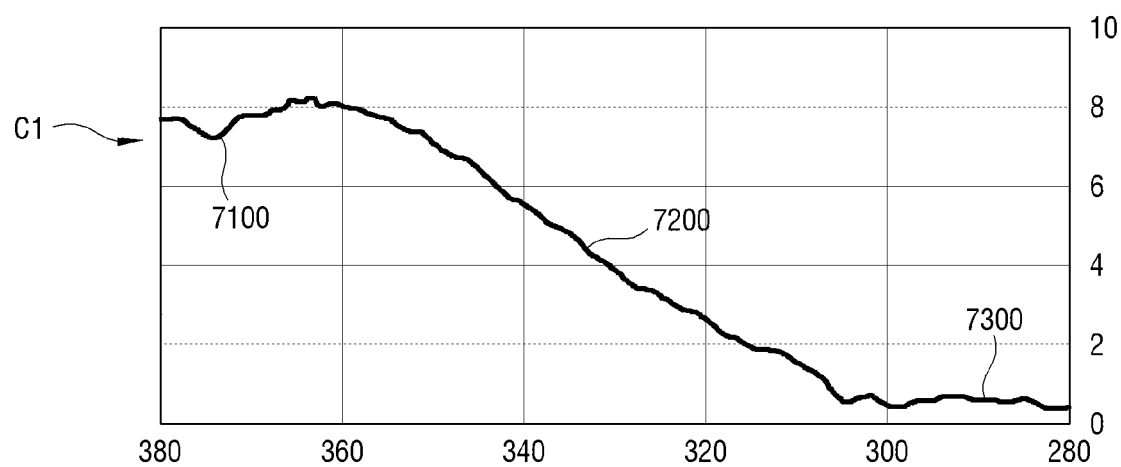
FIG. 7 is a diagram illustrating a profile of a section machined using a $CO_2$ laser according to various embodiments.
Figure 8:
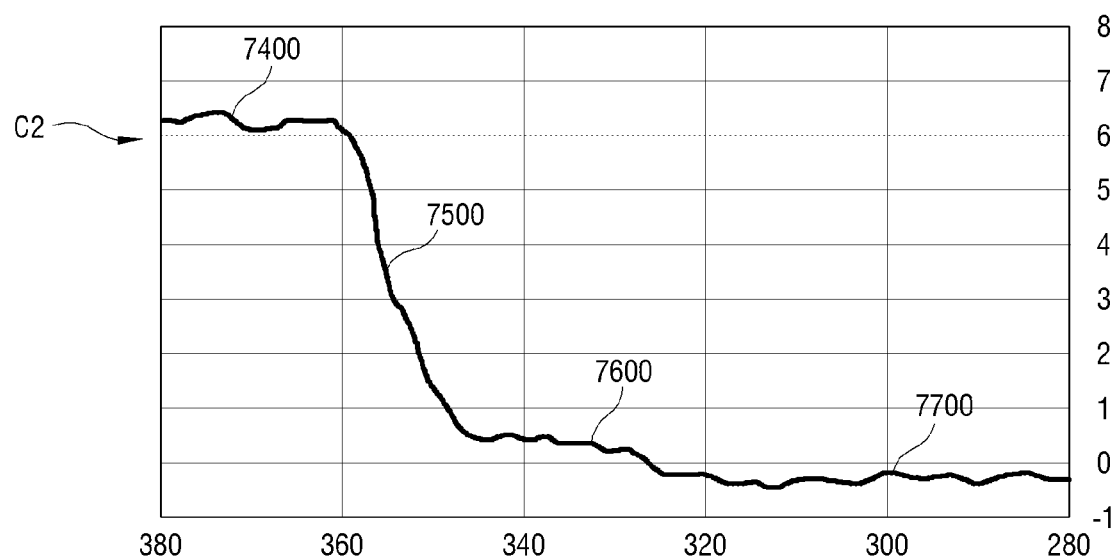
FIG. 8 is a diagram illustrating a profile of a section machined using a green laser according to various embodiments.

FIG. 7 is a diagram illustrating a profile of a section machined using the $CO_2$ laser, and FIG. 8 is a diagram illustrating a profile of a section machined using a green laser.

As shown in FIGS. 5, 7 and 8, the products of machining the ink layers based on the $CO_2$ laser and a green laser separately provided for comparison are shown as profiles. The abscissa and the ordinate of these profiles respectively indicate the distance and the height, but their specific values are not specified because these are just for comparison between the products based on two different lasers. The green laser is produced by adding an optical system, e.g., second harmonic generation (SHG) to a laser having a wavelength of 1064 nm. The curve C1 in FIG. 7 shows the profile of the cross-section machined based on the $CO_2$ laser, and the curve C2 in FIG. 8 shows the profile of the cross-section machined based on the green laser.

In the curve C1 (see FIG. 7), an area 7100 corresponding to an unmachined print layer is an upper layer surface of a printed ink layer, which corresponds to the second layer surface 4200 of the ink layer 4000. An area 7300 corresponding to a transparent layer corresponds to the second surface 2200 of the front plate 2000. These areas refer to areas which are not machined by the $CO_2$ laser. An area 7200 corresponding to a machined surface, which is formed between the area 7100 corresponding to the unmachined print layer and the area 7300 corresponding to the transparent layer, refers to an area machined by the $CO_2$ laser, which corresponds to the first inclined surface 4300 or the second inclined surface 4400 of the ink layer 4000. As the product of using the $CO_2$ laser, the curve C1 shows that the area 7200 corresponding to the machined surface has a gentle slope and the lower side of the area 7200 corresponding to the machined surface leads to the area 7300 corresponding to the transparent layer in parallel without little height difference. Accordingly, little dust occurs when the ink layer is machined using the $CO_2$ laser (and little dust is accumulated).

On the other hand, in the curve C2 (see FIG. 8), an area 7400 corresponding to an unmachined print layer and an area 7700 corresponding to a transparent layer are areas which are not machined by the green laser. However, an area 7500 corresponding to a machined surface has a steeper slope than the area 7200 corresponding to the machined surface in the curve C1, and approximates to a vertical height difference. For example, when the profile of the area 7200 corresponding to the machined surface in the curve C1 has a length of 60 μm, the profile of the area 7500 corresponding to the machined surface in the curve C2 has a much shorter length of about 10 to 15 μm. Let the inclination angle of the area 7200 corresponding to the machined surface in the curve C1 be $\theta_1$, and the inclination angle of the area 7500 corresponding to the machined surface in the curve C2 be $\theta_2$. Based on the profile according to this embodiment, $\tan(\theta_1)=8/60=0.13$, and $\tan(\theta_2)=6/20=0.3$ (because it is just for the comparison between the curves C1 and C2, the curves C1 and C2 are not matched with respect to a unit scale between the horizontal length and the vertical length of the profile). In this case, because $\theta_1=7.5$ and $\theta_2=17$, $\theta_1$ has a much gentler slope than $\theta_2$. When it is taken into account that one of the purposes of the first inclined surface 4300 according to an embodiment of the disclosure is to prevent and/or reduce bubble defects through close adhesion, the steep slope relatively increases the risk of generating bubbles.

Further, there is an area, which has a greater height-difference than the area 7700 corresponding to the transparent layer, between the area 7500 corresponding to the machined surface and the area 7700 corresponding to the transparent layer, and this area refers to an area 7600 corresponding to a dust layer where the dust of the ink generated by the machining of the green laser is accumulated. The area 7600 corresponding to the dust layer also causes a defect (for example, the quality of an image taken by the camera is deteriorated). For example, when the profile of the area 7500 corresponding to the machined surface has a length of about 10 to 15 μm, the profile of the area 7600 corresponding to the dust layer has a length of about 20 μm.

Accordingly, the $CO_2$ laser can minimize or reduce the generation of dust while precisely forming the area 7200 corresponding to the machined surface, which is suitable for the purposes of an example embodiment, as compared with other lasers (e.g., the green laser, the IR laser, an ultraviolet (UV) laser, etc.).

Figure 9:
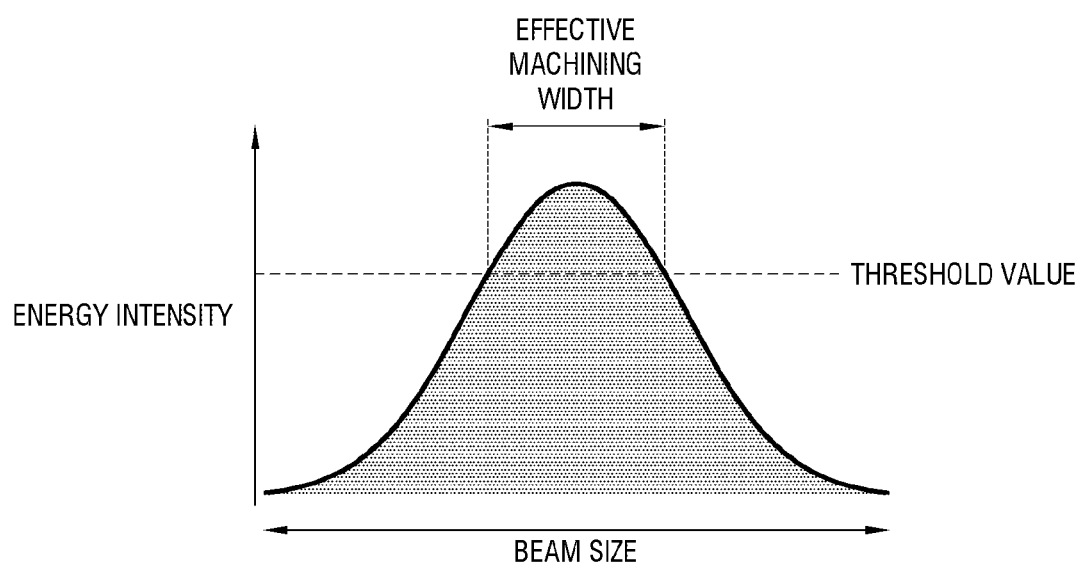
FIG. 9 is a graph showing a relationship between a laser-beam size and energy intensity according to various embodiments.

FIG. 9 is a graph illustrating a relationship between a laser-beam size and energy intensity according to various embodiments.

FIG. 9 illustrates a cross section of the laser beam, in which energy is distributed in a region from the center of the laser beam to the outer edge. The energy distribution of the laser beam may be the Gaussian distribution. For example, when the laser beam has a circular cross-section, the laser has the strongest intensity at the center thereof, and becomes weaker toward the outer edge. Based on this characteristic, the width of the laser beam, which has energy intensity higher than or equal to a specific threshold, is set to perform machining. In the planar section of the laser beam, a region set for substantial machining is called an effective machining width. In other words, a region including the center of the laser beam, in which the energy intensity is higher than or equal to the threshold, is set as the effective machining width. In result, the machined surface in the ink layer has a gentle inclined surface.

For example, when a surface is machined by the $CO_2$ laser beam to have an inclination width of 100 to 125 μm, the machined surface is required to have a roughness of 50 μm or lower to ensure proper quality. The roughness of the machined surface is adjustable based on the effective machining width of the laser beam. The smaller the effective machining width of the laser beam, the smoother the machined surface. The larger the effective machining width of the laser beam, the rougher the machined surface. Of course, the foregoing numerical values are merely an example, and may be varied depending on designs of a product. To achieve such roughness, there is a need of managing and adjusting parameters for a scanning speed, a machining frequency, etc. of the laser beam.

For reference, a $CO_2$ laser-beam size S may be calculated by the following equation.

$$S = \{4*(M^{\wedge}2)*\lambda*f\}/(\prod *D) \quad \text{[Equation]}$$

Where, λ is a wavelength (μm), f is a focal length of lens (mm), D is a diameter of an input beam, and (M^2) is a beam mode parameter.

The machining line of the laser beam is realized as polylines formed by connecting many laser dots. The laser machining proceeds from the front plate 2000 in a direction of the ink layer. Thus, it is possible to reduce defects caused by thermal damage and machining errors.

Figure 10:
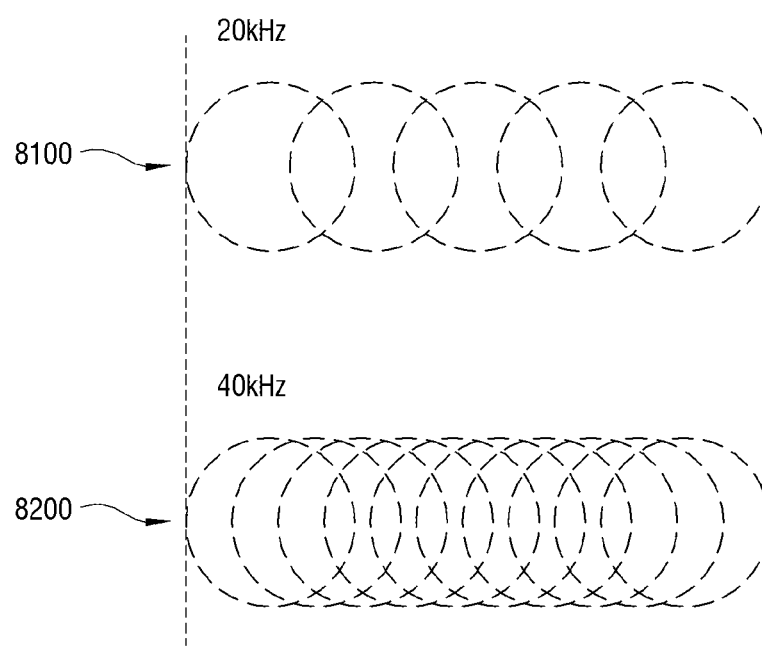
FIG. 10 is a diagram illustrating example polylines based on difference in frequency of laser output according to various embodiments.

FIG. 10 is a diagram illustrating example polylines based on difference in frequency of laser output.

As shown in FIGS. 4, 5 and 10, polylines are formed by the laser outputs different in frequency. For example, when polylines 8100 are formed by five laser dots overlapped within a unit distance for a predetermined taken time at a frequency of 20 kHz, there is difference in a machining amount at intervals of 100 μm. On the other hand, at a frequency of 40 kHz, twice as high as 20 kHz, polylines 8200 are formed by ten laser dots overlapped within the same unit distance for the same taken time as those of the foregoing case. Under the same time and the same distance, the number of laser dots in the polylines 8200 at 40 kHz is twice as large as the number of laser dots in the polylines 8100 at 20 kHz, and therefore there is a difference in a machining amount at intervals of 50 μm.

In other words, when the output frequency becomes lower, a space between the laser dots becomes wider, thereby increasing the roughness of the machined surface. On the other hand, when the output frequency becomes higher, a space (more specifically, an overlap distance) between the laser dots becomes narrower, thereby decreasing the roughness of the machined surface. Like this, it is possible to machine the surface more smoothly as the laser output frequency becomes higher. However, when the output frequency is excessively highly adjusted, the front plate 2000 is likely to crack during the machining. Therefore, it is necessary to appropriately adjust the output frequency and the beam size.

In the laser dot-pattern area 5000, the first pattern area 5100 and the second pattern area 5200 may be machined by the laser based on the same frequency output. When the first pattern area 5100 and the second pattern area 5200 are required to have different characteristics (for example, dif-ference inclinations, etc.), they may be machined by the lasers based on the different frequency outputs.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a housing;
a transparent glass substrate covering at least a portion of the housing, and comprising a first surface facing a first direction and a second surface facing a second direction opposite to the first direction;
a display panel accommodated in the housing, covered with the glass substrate, and comprising at least one opening configured for light transmission in a display area where an image is displayed;
an ink layer having an opaque color, applied to an opaque area surrounding an edge of the opening to form a light-transmission area corresponding to the opening on the second surface, the ink layer comprising an inclined portion where the ink layer becomes narrower in the second direction from the second surface; and
a laser dot-pattern area adjacent to the opaque area and formed on the second surface of the glass substrate.

2. The electronic apparatus of claim 1, wherein the laser dot-pattern area is formed by at least one of a carbon dioxide (CO2) laser or a green laser.

3. The electronic apparatus of claim 2, wherein an inclined area of dots comprising the laser dot-pattern formed based on the CO2 laser is different in inclination angle from an inclined area of dots comprising the laser dot-pattern formed based on the green laser.

4. The electronic apparatus of claim 1, further comprising an optical sensor,
wherein the opening is configured to accommodate at least a portion of the optical sensor.

5. The electronic apparatus of claim 1, further comprising an adhesive layer interposed between the glass substrate and the display panel attaching the display panel and the glass substrate.

6. The electronic apparatus of claim 5, wherein the adhesive layer comprises an optically clear adhesive (OCA).

7. The electronic apparatus of claim 5, wherein the inclined area comprises a first inclined surface at an outer edge of the ink layer and in contact with the adhesive layer.

8. The electronic apparatus of claim 7, further comprising a first laser dot-pattern area formed along an edge of the first inclined surface, on the second surface of the glass substrate in contact with the adhesive layer.

9. The electronic apparatus of claim 7, wherein the inclined area comprises a second inclined surface at an inner edge of the ink layer surrounding the light-transmission area.

10. The electronic apparatus of claim 9, further comprising a second laser dot-pattern area formed along an edge of the second inclined surface, on the second surface of the glass substrate.

11. The electronic apparatus of claim 1, wherein the ink layer comprises a black ink layer printed on the glass substrate.

12. The electronic apparatus of claim 11, wherein the inclined area is formed by machining the black ink layer using a CO2 laser.

13. An electronic apparatus comprising:
- a housing;
- a transparent glass substrate covering at least a portion of the housing, and comprising a first surface facing a first direction and a second surface facing a second direction opposite to the first direction;
- a display panel accommodated at least partially in the housing, covered with the transparent glass substrate, the display panel including a display area where an image is displayed, a light-transmission area through which light is to be transmitted, and an opaque area surrounding the light-transmission area and forming a boundary between the display area and the light-transmission area;
- an ink layer having an opaque color, applied to the opaque area; and
- an adhesive layer interposed between at least the glass substrate and the display panel attaching the display panel and the glass substrate,
- wherein the ink layer comprises an inclined portion where the ink layer becomes narrower in the second direction from the second surface toward the display panel, and wherein the adhesive layer adhering to the glass substrate and the inclined portion of the ink layer prevents or reduces bubbles from being formed in the adhesive layer.

* * * * *